Dec. 25, 1934.  D. H. HARNLY  1,985,724
WEATHER STRIP
Filed July 9, 1934
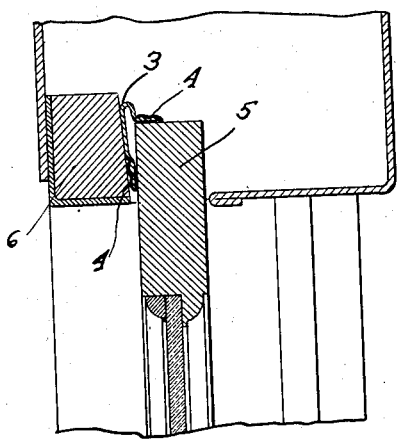
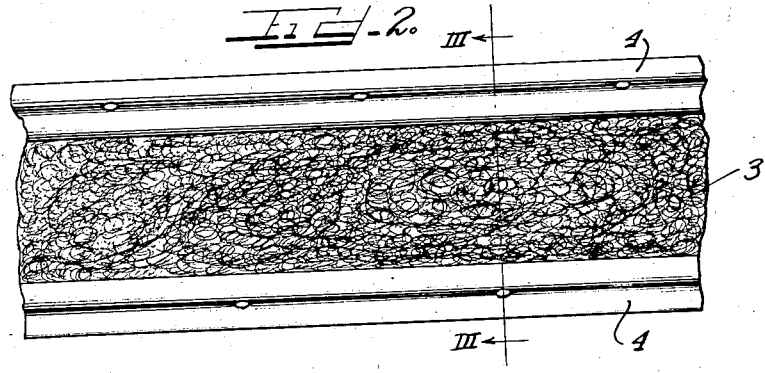
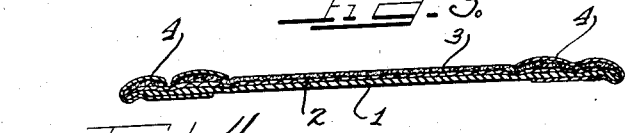
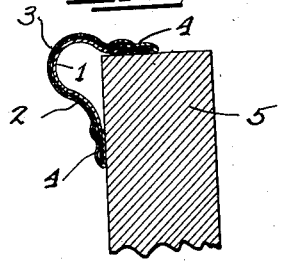
Inventor
David H. Harnly.
by Charles O'Neill Attys.

Patented Dec. 25, 1934

1,985,724

UNITED STATES PATENT OFFICE 1,985,724

WEATHER STRIP

David H. Harnly, Chicago, Ill.

Application July 9, 1934, Serial No. 734,261

5 Claims. (Cl. 20—69)

This invention relates to a weather strip and concerns itself with a structure that possesses the requisite amount of toughness, flexibility, and the capability of readily catching dust, dirt and the like, and that is adapted to be applied for sealing different widths of spaces to be sealed.

The invention comprises the novel structure and combination of parts hereinafter described and more particularly pointed out and defined in the appended claims.

In the accompanying drawing which illustrates a preferred form of this invention and in which similar reference numerals refer to similar features in the different views:

Figure 1 is a fragmentary sectional view through the upper part of a window and its frame illustrating the application of a weather strip involving this invention.

Figure 2 is an enlarged fragmentary top plan view of the weather strip involving this invention.

Figure 3 is an enlarged sectional view taken upon the line III—III of Figure 2.

Figure 4 is an enlarged fragmentary sectional view through the upper part of the sash of a window illustrating the application of the weather strip.

In accordance with this invention, the weather strip involving this invention is made from a plurality of different materials including a resilient backing material, an intermediate strengthening material and a dust and dirt absorbing material that constitutes the facing of the weather strip. While different materials may be used, the ones illustrated and hereinafter described are to be understood as merely the preferable ones.

The resilient backing material 1 (Fig. 3) consists of rubber, preferably sponge rubber that is also quite pliable in order to reduce undue pressure and friction when the weather strip slides against an opposing surface.

The intermediate strengthening material 2 that adds the requisite amount of toughness to the weather strip may consist of canvas or any suitable fabric.

The facing 3 of the weather strip consists preferably of felt or the like that possesses the capability of readily catching dirt, dust or the like.

The different materials above related are combined to produce a composite weather strip that possesses sufficient flexibility, durability and the capability of catching dust, dirt or the like.

The weather strip may be made of any desired width and length. It is preferably made in long strips with the margins encased in metal casings 4 through which the securing means are designed to pass for attaching the weather strip to a window sash. It will be noted that the weather strip may be readily bowed or flexed before it is attached, and that the flexed portion may be made of any desired extent to seal a wide or narrow space.

In Figures 1 and 4 there is shown the application of such a weather strip to the upper portion 5 of a window sash. It will be noted that one edge of the weather strip is attached to the top of the sash while the other edge is attached to the inner edge of the sash and that the portion of the strip between the attached portions extends in the form of a compressible loop that engages the window frame 6.

From the foregoing it will be appreciated that the novel strip has all the requisites necessary for efficiently performing its function in that it possesses durability, resiliency and a dust and dirt collecting surface.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. A composite weather strip comprising a resilient backing, a felt facing and an intermediate fabric strengthening member.

2. A composite weather strip comprising a strip of resilient material forming the base, a strip of dust and dirt collecting material forming the face and an intermediate reinforcing material.

3. A composite weather strip comprising a strip of sponge rubber, forming the base, a strip of felt forming the face and an intermediate strip of fabric for reinforcing the weather strip.

4. A composite weather strip comprising a backing strip of sponge rubber, a fabric strip secured to said sponge rubber, a felt strip attached to said fabric strip, and a casing attached to the opposite longitudinal edges of said strips whereby said strip may be flexed and secured in flexed position.

5. A composite weather strip comprising a backing strip of sponge rubber, a tough fabric strip superposed upon the rubber strip and a felt strip superposed upon the fabric strips and means for combining said strips into a unitary structure.

DAVID H. HARNLY.